United States Patent
Takahashi

(10) Patent No.: US 7,630,158 B2
(45) Date of Patent: Dec. 8, 2009

(54) DATA LOSS PREVENTION METHOD OF A MEDIA STORAGE DEVICE AND MEDIA STORAGE DEVICE

(75) Inventor: Tsuyoshi Takahashi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 769 days.

(21) Appl. No.: 11/318,765

(22) Filed: Dec. 27, 2005

(65) Prior Publication Data

US 2007/0041118 A1 Feb. 22, 2007

(30) Foreign Application Priority Data

Aug. 18, 2005 (JP) .............................. 2005-237061

(51) Int. Cl.
G11B 15/04 (2006.01)
G11B 19/04 (2006.01)

(52) U.S. Cl. .............................. 360/60; 360/31; 360/53; 360/59; 360/62

(58) Field of Classification Search .................... 360/31, 360/53, 59, 60, 62, 77.02
See application file for complete search history.

(56) References Cited

U.S. PATENT DOCUMENTS

| | | | | |
|---|---|---|---|---|
| 5,233,482 A | * | 8/1993 | Galbraith et al. .............. | 360/46 |
| 6,603,617 B1 | * | 8/2003 | Cross .......................... | 360/31 |
| 6,628,466 B2 | * | 9/2003 | Alex ........................... | 360/31 |
| 7,024,617 B2 | * | 4/2006 | Sawaguchi et al. .......... | 714/794 |
| 7,173,782 B2 | * | 2/2007 | Ikeda et al. .................... | 360/31 |
| 7,173,783 B1 | * | 2/2007 | McEwen et al. .............. | 360/46 |
| 7,209,304 B2 | * | 4/2007 | Seng et al. .................... | 360/25 |
| 2001/0010603 A1 | * | 8/2001 | Uzumaki et al. .............. | 360/31 |
| 2002/0126410 A1 | * | 9/2002 | Doi et al. ....................... | 360/69 |
| 2003/0016461 A1 | * | 1/2003 | Seng et al. .................... | 360/25 |
| 2003/0067697 A1 | * | 4/2003 | Weinstein et al. ............. | 360/31 |

FOREIGN PATENT DOCUMENTS

| | | |
|---|---|---|
| JP | 10-255202 | 9/1998 |
| JP | 10-255209 | 9/1998 |
| JP | 11-353820 | 12/1999 |
| JP | 2001-216605 | 8/2001 |
| JP | 2001-273724 | 10/2001 |
| JP | A 2004-71060 | 3/2004 |
| JP | A 2005-4869 | 1/2005 |
| JP | 2005-174461 | 6/2005 |

* cited by examiner

*Primary Examiner*—Dismery E Mercedes
(74) *Attorney, Agent, or Firm*—Greer, Burns & Crain, Ltd.

(57) ABSTRACT

A media storage device reads and writes data from and to a storage medium using a head and prevents in advance data loss due to thermal relaxation of data recorded on the storage medium. Table stores information which is related to a read error detected by a channel circuit in record units. The channel circuit measures information which is related to a read error and updates the information in the table. Further, data degradation is judged by this information which is related to the read error. Degradation of recorded data due to thermal relaxation can be detected accurately, and data loss can be prevented.

8 Claims, 15 Drawing Sheets

⟶ PROBABLE DATA SERIES
----▶ ERRONEOUS DATA SERIES

FIG. 21

| TIME ELAPSED AFTER WRITING | 1 MINUTE | 60 MINUTES | 24 HOURS | 1 MONTH | 1 YEAR | 5 YEARS |
|---|---|---|---|---|---|---|
| [IN SECONDS] | 60 | 3600 | 86400 | 2592000 | 31536000 | 157680000 |
| LOG SCALE (DECADES) | 1.78 | 3.56 | 4.94 | 6.41 | 7.50 | 8.20 |
| BER DEGRADATION [POWER] | 0.00 | 0.53 | (0.95) | (1.39) | (1.72) | (1.93) |

DATA LOSS PREVENTION METHOD OF A MEDIA STORAGE DEVICE AND MEDIA STORAGE DEVICE

CROSS-REFERENCE TO RELATED APPLICATIONS

This application is based upon and claims the benefit of priority from the prior Japanese Patent Application No. 2005-237061, filed on Aug. 18, 2005, the entire contents of which are incorporated herein by reference.

BACKGROUND OF THE INVENTION

1. Field of the Invention

This invention relates to a data loss prevention method of a media storage device which uses a head to record data on a magnetic disk or other recording media, and in particular relates to a data loss prevention method of a media storage device which prevents in advance data loss due to degradation of the recorded data on the recording media due to thermal relaxation, and to a media storage device.

2. Description of the Related Art

Demands imposed on electronic data processing in recent years have led to requests for media storage devices, such as magnetic disk devices and magneto-optic disc devices which store data in media, with increased data capacities. As a consequence, the track densities and recording densities of storage media continue to increase. There are also demands to reduce unused areas on tracks.

Information is recorded on magnetic media for data recording and storing through positive and negative magnetization inversions. In some cases, certain fluctuations, which may be magnetic noise and slight magnetization inversions due to atomic-level thermal energy, may cause magnetization in a direction to cancel this recording magnetization, so that the magnetization state is weakened, and the recorded coercive force is reduced. This phenomenon is called "thermal relaxation" or "thermal fluctuations".

When the thermal relaxation phenomenon occurs, a reduction in S/N ratio, that is, worsening of the error rate tends to occur, and problems relating to reliability such as failure to read previously recorded data may arise. In the worst case, there is the possibility that data may be lost.

Such a decline in recording coercive force (decline in magnetization) has until recently occurred with a time constant of several tens of years or longer, and so until now has not been considered a problem at all; but with increases in recording densities in recent years, and time constants of the order of several years, the occurrence of declines in magnetization has come to be regarded as a problem.

For example, FIG. 20 and FIG. 21 are used to explain a case in which the error rate worsens with the passage of time due to thermal relaxation. As shown by the data in FIG. 20 for the BER (bit error rate) with the passage of time after writing, a case is considered in which the BER is degraded by the 0.53 power of ten, that is, $1 \times 10^{\wedge}(-6.0)$ errors/bit to $1 \times 10^{\wedge}(-5.47)$ errors/bit, from an elapsed time of 1 minute (in logarithmic representation, 1.78) to 60 minutes (in logarithmic representation, 3.56). As indicated in FIG. 21, represented as the ratio to the time elapsed from (as a logarithm) 1.78 (1 minute) to 3.56 (60 minutes), this is $0.53/(3.56-1.78)=0.53/1.78=0.3$.

That is, there is a degradation of approximately 0.3 power per decade. If this is expressed as 0.3 power/decade, then after five years (8.2 decades), a degradation of $0.3 \times (8.2-1.78) = 1.93$ power occurs. Hence at time of product shipment, if for example the quality assurance period is 5 years, then assurance against the occurrence of unrecovered errors (bit error rate or BER=1e−13 (−13th power)) is necessary for as long as five years after data has been written. In this case, the product must be shipped after verifying the error rate with error rate degradation due to thermal relaxation over five years superposed on the error rate at the time of product shipment.

In this example, a product shipment system is necessary which is able to provide an assurance of a BER of −14.93 power, resulting from an unrecovered error occurrence assurance (BER=−13th power) on which is superposed the thermal relaxation-related degradation over 5 years of 1.93 power.

But when using such a method, because recording and reproduction characteristics differ depending on the head and recording media characteristics, in addition to employing heads and recording media with still better characteristics, during tests at the time of product shipment it is necessary to perform shipment tests in which the thermal relaxation degradation is measured and a playback margin added corresponding to the degradation forecast to occur over five years. These tests require time and labor, and are unsuitable for mass production.

In light of this, in the past the various methods described below have been proposed for preventing data loss due to thermal relaxation.

(1) Separately from ordinary data, reference data is recorded in a prescribed area of the recording media, and depending on the reproduction level of this reference data, the necessity for prevention of data loss for the corresponding data is judged (see for example Japanese Patent Laid-open No. 10-255202 (FIG. 4)).

(2) Because recorded data is degraded with the time elapsed from recording, the address and recording time of recorded information is stored in recorded information units, with the current time provided by the host is compared with the recorded time to determine the elapsed time, to judge the necessity of re-recording. In addition, changes in the temperature of the media are detected, and when changes are considerable, re-recording is performed (see for example Japanese Patent Laid-open No. 10-255209).

(3) Recorded data is reproduced, the reproduction level is compared with a reference level, and a judgment is made as to the occurrence of degradation due to thermal relaxation (see for example Japanese Patent Laid-open No. 2001-216605 (FIG. 3)).

Recently there have been demands for storage devices with higher recording densities and lower prices. The conventional technology (1) assumes that the reproduction level of the reference data is proportional to the level of the actual data; but as is well known, the thermal relaxation phenomenon differs depending on the recording pattern, and so it is difficult to accurately determine which data should be re-recorded by detecting the reproduction level of reference data. If large quantities of reference data are recorded in order to alleviate this problem, then a large prescribed area for reference data recording must be provided on the storage media, and the problem of unused recording areas arises.

In the case of the conventional technology (2), the reference signal and the reference signal recording time are recorded, and the quality of the reference signal is monitored; when degradation of the quality of the reference signal is detected, recorded information recorded at the same time as the recording time of the reference signal is re-recorded. Because the reference signal is a data series which is easily affected by thermal fluctuations, it differs from actual data series, and so there is the problem that data for which re-recording is not necessary is also judged to be in need of re-recording.

However, because recorded information units are for example sector units, numerous time information items must be stored, and moreover comparison of times requires time. And because judgments are made only as a function of temperature changes and elapsed time, recorded data for which there is no decline in quality is also re-recorded, so that there is a large possibility that a vast amount of unnecessary processing will be performed.

In the case of conventional technology (3), recorded data must be read out and a level judgment made, and when there is a vast amount of data recorded on the storage media, there is the problem that time is required to judge degradation; moreover, in order to detect the level of the reproduced data, apart from a read data channel, a separate special channel comprising an A/D converter is necessary, so that additional hardware is required.

SUMMARY OF THE INVENTION

Hence an object of this invention is provide a data loss prevention method for media storage devices and a media storage device which detects, with comparatively good accuracy, the degradation of recorded data due to thermal relaxation, and which prevents data loss through simple management.

A further object of this invention is provide a data loss prevention method for media storage devices and a media storage device to accurately detect the degradation of recorded data due to thermal relaxation using a small recording area.

A further object of this invention is provide a data loss prevention method for media storage devices and a media storage device to accurately detect, in a short amount of time, the degradation of recorded data due to thermal relaxation.

A further object of this invention is provide a data loss prevention method for media storage devices and a media storage device to accurately detect the degradation of recorded data due to thermal relaxation, without addition of hardware.

In order to attain these objects, a media storage device of this invention has a head which reads and writes data from and to a storage medium; a channel circuit which demodulates read data transferred from the head and modulates write data for transfer to the head; a control circuit which controls read and write operations of the head according to commands from a higher-level device; and a management table which holds information, in record units of said storage medium, which is related to an read error detected by the channel circuit. The control circuit reads, via the channel circuit, data recorded on the storage medium in record units via the channel circuit, measures the information which is related to an read error detected by the channel circuit during reading, and performs updates of the information in the management table using the measured values, while also judging the degradation of data in record units based on the measured values.

Further, a data loss prevention method of this invention is a data loss prevention method, in a media storage device having a head which reads and writes data from and to a storage medium, a channel circuit which demodulates read data transferred from the head and modulates write data to be transferred to the head, and a control circuit which controls read and write operations of the head according to commands from a higher-level device. The data loss prevention method has a step of storing, in record units in a management table, information which is related to an read error detected by the channel circuit; a step of reading via the channel circuit, in record units of the storage medium, data recorded on the storage medium, and of measuring the information which is related to an read error detected by the channel circuit during the reading; a step of updating the information in the management table using the measured value; and a step of judging degradation in record units from the measured value.

In this invention, it is preferable that the channel circuit has a maximum-likelihood decoder which detects the most probable data series from the context of state transitions which are possible for the read data, and that the control circuit update the table using parameters to detect the most probable data series from the context of the maximum-likelihood decoder, as the information which is related to the read error.

In this invention, it is preferable that the maximum-likelihood decoder detects, as parameters to detect the most probable data series, information relating to errors between ideal values of state transitions possible in the context of the read data and the read data, and that the control circuit update the table with information relating to the errors of the maximum-likelihood decoder, as the information which is related to the read error.

In this invention, it is preferable that the maximum-likelihood decoder detect, as the most probable data series, the data series for which the number of times that the cumulative sum of errors between the ideal values and the read data exceeds a prescribed value is -small, and that the control circuit update the table with the number of times for the maximum-likelihood decoder as the above parameter.

In this invention, it is preferable that the control circuit compare the measured value with a prescribed threshold value, and depending on the result of the comparison, re-record data in record units in the storage medium.

In this invention, it is preferable that the table stores information indicating the time elapsed from the recording time of the recorded data as well as the measured value in a record unit, and the control circuit reads the information indicating the time elapsed from the recording time of the recorded data as well as the measured value from the table, and performs the measurement and the update for the record on which the time by the time elapsed information exceeds the reference time.

In this invention, it is preferable that the control circuit take the cumulative sum of the operating time of the device, judge that the cumulative operating time has exceeded a prescribed value, and execute measurement and updating of the measured values of the table.

In this invention, it is preferable that the table store manufacturing date information for the device, and that the control circuit read the manufacturing date information from the table, and upon judging that the number of days elapsed to the current date exceeds a reference number of days, execute measurement and updating of the measured values of the table.

In this invention, it is preferable that the control circuit compare the measured value with a prescribed threshold value after the measurement, and depending on the result of the comparison, re-record data in record units in the storage medium.

In this invention, it is preferable that the table stores update date of the measured value as well as the measured value in a record unit, and the control circuit reads the updated date as well as the measured value from the table, and performs the measurement and the update for the record on which an elapsed date from the updated date to a current date exceeds the reference date.

In this invention, it is preferable that the storage medium be a magnetic storage medium.

According to this invention, since data degradation due to thermal relaxation is judged by using information which is related to an read error detected by the channel circuit, a record data degradation can be accurately detected, so thermal relaxation is data loss can be prevented. And because the read error related information is used, degradation of recorded data due to thermal relaxation can be detected accurately in a short length of time, and using a small recording area, so that hardware addition can also be prevented.

BRIEF DESCRIPTION OF THE DRAWINGS

FIG. 21 explains the BER degradation due to thermal relaxation in a magnetic disk.

DESCRIPTION OF THE PREFERRED EMBODIMENTS

Below, embodiments of the invention are explained in the order of a media storage device, thermal relaxation map, thermal relaxation map creation processing, thermal relaxation map update processing, and other embodiments.

Media Storage Device

Figure 1:
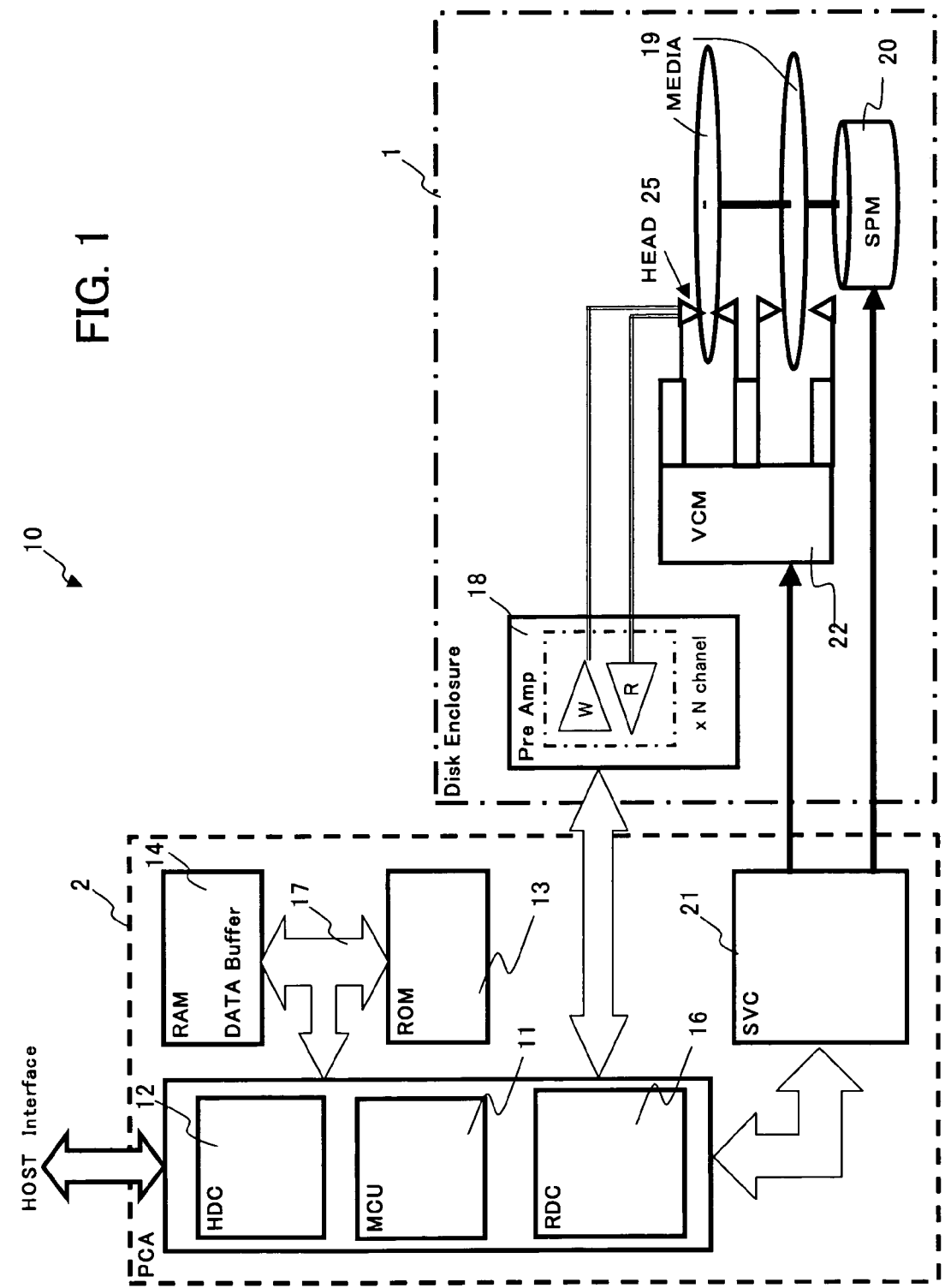
FIG. 1 shows the configuration of a media storage device of an embodiment of the invention.
Figure 2:
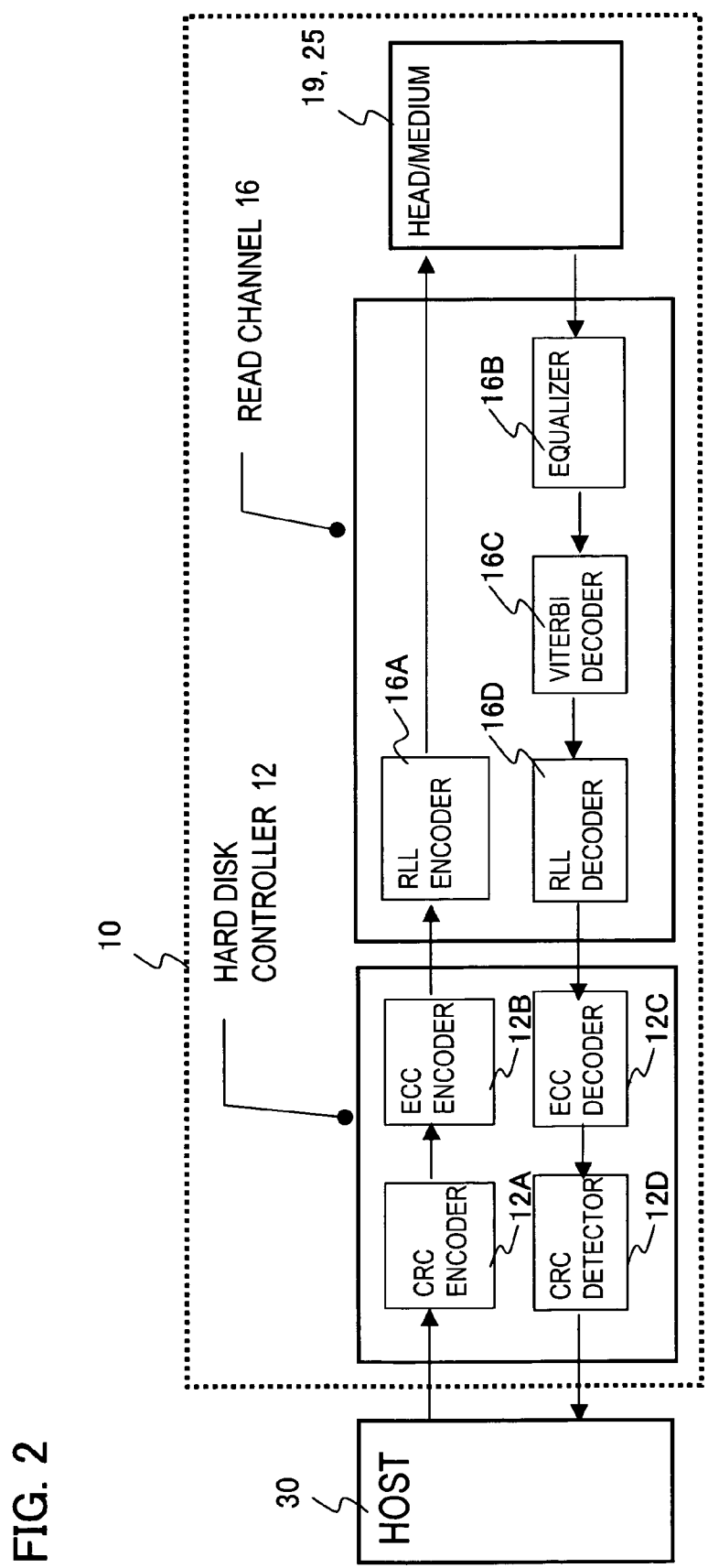
FIG. 2 shows the configuration of the read/write system of FIG. 1.

FIG. 1 shows the configuration of the media storage device of one embodiment of the invention; FIG. 2 shows the configuration of the recording/reproduction circuitry in FIG. 1.

FIG. 1 shows an example in which a hard disk drive which reads and writes data from and onto a magnetic disk is used as the media storage device.

As shown in FIG. 1, the magnetic disk device 10 is either incorporated within or connected to a personal computer (described later in FIG. 2), and is connected to the personal computer host (not shown in FIG. 1) via an ATA (AT Attachment) standard or other interface cable (not shown).

The magnetic disk device 10 has, within a disk enclosure 1, a plurality (here, two) of magnetic disks 19, a spindle motor 20 which rotates the magnetic disks 19, a plurality (here, four) of magnetic heads 25 which read and write data from and to each of the surfaces of the magnetic disks 19, an actuator (VCM) 22 which moves the magnetic heads 25 in the radial direction (track-traversing direction) of the magnetic disks 19, and a head IC (pre-amp) 18.

The control board 2 includes an HDC (Hard Disk Controller) 12, a data buffer 14, an MCU 11, memory (RAM/ROM) 13, a read channel circuit 16, a spindle motor/VCM driver 21, and buses 17 connecting these.

The HDC 12 has an interface control circuit having a task file to set tasks from a host, and a data buffer control circuit which controls the data buffer 14. The read channel circuit 16 demodulates read data and generates write gate.

The data buffer 14 serves as cache memory, holding write data from the host and holding read data from the magnetic disks 19. Upon write-back, the write data in the data buffer 14 is written to the magnetic disks 19, and during reading the read data in the data buffer 14 is transferred to the host.

The head IC (pre-amp) 18 sends a recording current to the magnetic heads 25 during writing according to the write data, and amplifies read-out signals from the magnetic heads 25 for output to the read channel circuit 16 during reading. The spindle motor/VCM driver 21 drives the spindle motor 20 in rotation, and drives the VCM 22 to move the magnetic heads 25.

The MCU (Micro Controller Unit) 11 performs control to position the magnetic heads 25, read/write control, and retry control. The memory (ROM/RAM) 13 stores data necessary for processing by the MCU 11. A read/write timing circuit is provided in the read channel circuit 16; the MCU 11 acts in concert with this timing circuit to execute read/write control.

As shown in the configuration of the write and read system in FIG. 2, user data sent from the host computer 30, comprising a binary pattern of "0"s and "1"s, is input to the hard disk controller 12. The hard disk controller 12 adds a CRC to the user data using a CRC (Cyclic Redundancy Check) encoder 12A to enable error correction detection, adds an ECC (Error Correcting Code) for error correction using an ECC encoder 12B, and inputs the result to the read channel circuit 16.

In the read channel circuit 16, a RLL (Run Length Limited) encoder 16A to enable timing correction during PLL (Phase Locked Loop) reproduction encodes the input data. The output of the RLL encoder 16A is then magnetically recorded onto, and reproduced from, the disk 19 via the head IC 18 and the head 25.

On the other hand, an analog signal reproduced from a disk 19 by a head 25 is shaped into a desired target waveform, such as PR4 (Partial Response class 4), EPR4 (Extended PR4), EEPR4 (Extended EPR4), MEEPR4 (Modified EEPR4) or similar, by the equalizer 16B of the read channel circuit 16.

The shaped analog signal is decoded by a Viterbi decoder 16C, which is a maximum-likelihood decoder implementing a PRML (Partial Response Maximum Likelihood) method, and then is decoded by the RLL decoder 16D. And the result is output from the read channel circuit 16. This read channel output is subjected to error correction by the ECC decoder 12C of the hard disk controller 12, and after checking for error correction by the CRC detector 12D, is passed to the host computer 30.

In this invention, as explained below, upon each write operation a thermal relaxation map, which is re-recording management information, is created in record units and stored in the system area of a disk 19; this thermal relaxation map is read from the disk 19 into the RAM 14, a judgment is made as to whether to re-record the record, or, the record is updated and recorded in the system area.

Thermal Relaxation Map

Figure 3:
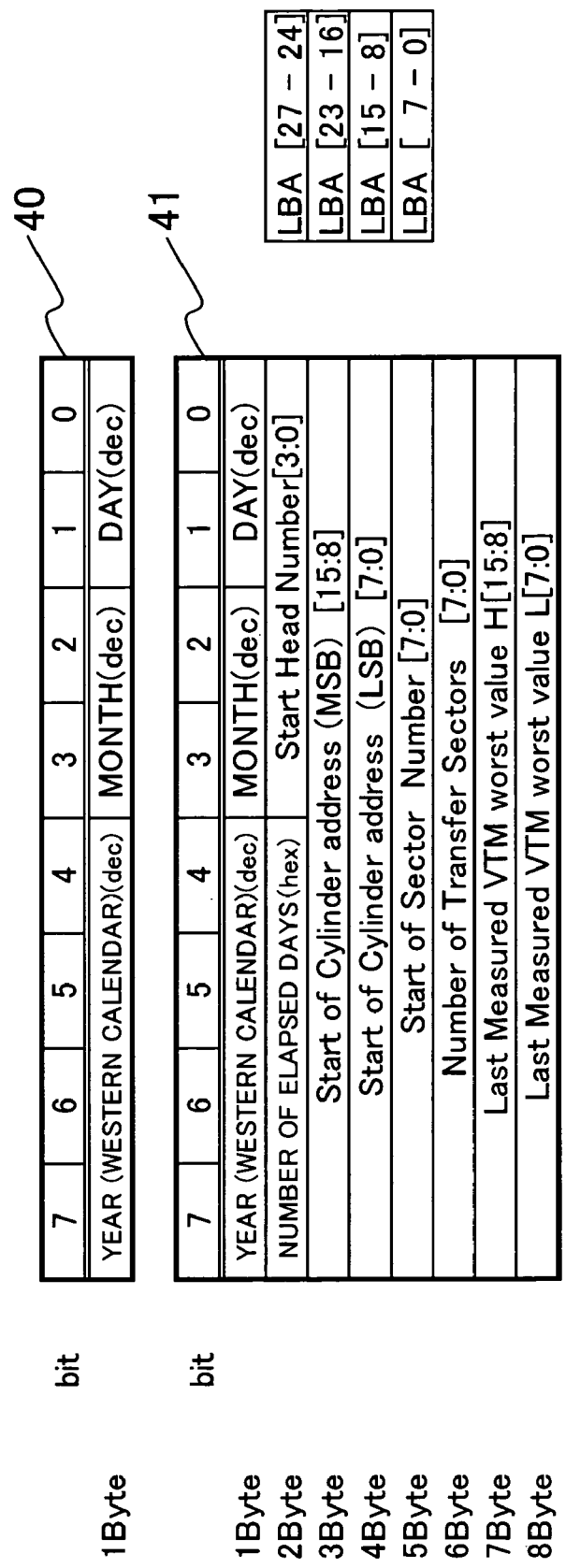
FIG. 3 explains a thermal relaxation map of an embodiment of the invention.
Figure 4:
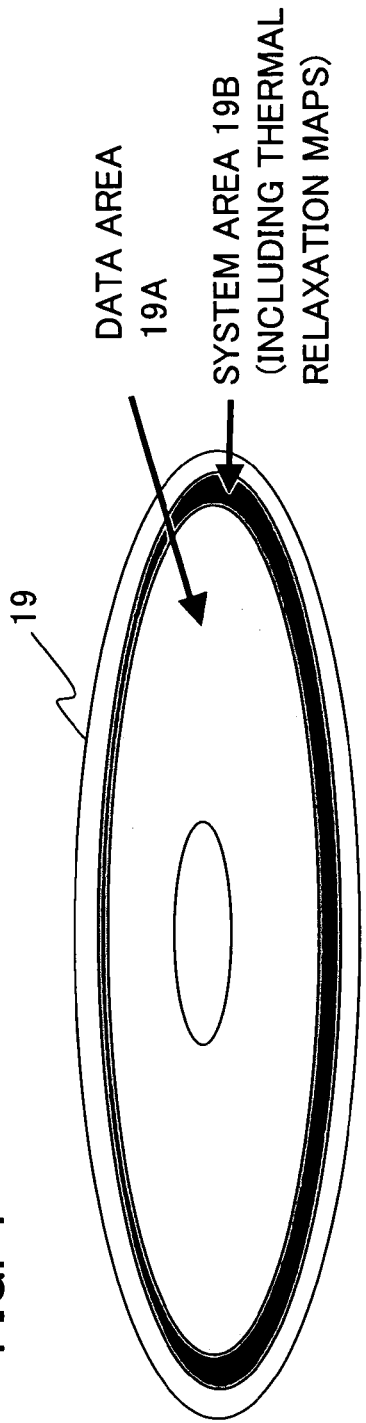
FIG. 4 explains storage positions on the thermal relaxation map of FIG. 3.

The thermal relaxation map, which is the above-described management information for use in re-recording, is explained. FIG. 3 explains a thermal relaxation map, FIG. 4 explains a thermal relaxation map storage area, FIG. 5 explains the state of storage in a sector of a thermal relaxation map, and FIG. 6 explains the thermal relaxation map RAM area for one command.

As shown in FIG. 3, the manufacturing date data 40 consists of one byte, indicating the manufacturing year, month and day, and is written to the system area 19B (see FIG. 4) of the disk 19 within the HDD at the time of product shipment.

Next, the configuration of a thermal relaxation map 41 is explained. In general, an ATA-specification command format is a CHS (Cylinder-Head-Sector) format; in particular, the CHS for which a write type command is issued is stored, and either promptly or when there is no command issued from the higher-level host, the VTM (Viterbi Trellis Margin), which is maximum-likelihood information, is measured, and this value is written to the thermal relaxation map 41. At this time, the update date (Western calendar) is also written.

In addition, the number of days elapsed from the manufacturing date until the update date is also written. By this means, the history of data written to the HDD can be ascertained from the "write date", the "number of days elapsed from the manufacturing date", and from the "VTM value", and the signal quality can be judged.

Here, a write type command is a Write Sector command to write a specified number of sectors to the media, a Write Long command to write a specified number of sectors in a (data+ ECC) byte configuration to the media, a Write Multiple command to write a specified number of blocks (comprising a plurality of sector units) to the media, or similar.

That is, as shown in FIG. 3, the thermal relaxation map 41 comprises 8 bytes; the writing date (Western calendar) is written in decimal to the first byte. The number of days elapsed from the write time until the current time at which data scanning is performed, and the relevant head number, are written to the second byte. The start cylinder number (MSB/ LSB) is written to the third and fourth bytes. The start sector number is written to the fifth byte. The number of sectors for which transfer is required is written to the sixth byte. The VTM value (MSB/LSB) for all relevant sectors is written to the seventh and eighth bytes.

Figure 5:
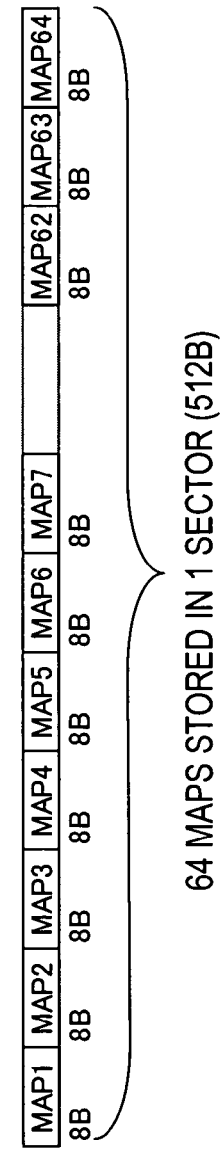
FIG. 5 explains the state of storage on the disk of the thermal relaxation map of FIG. 4.

As shown in FIG. 5, when such eight-byte thermal relaxation maps 41 are written to one sector, if one sector =512 bytes, and if the area outside the data area 19A on the disk 19 (the system area 19B) is prepared with approximately 100 tracks, then thermal relaxation maps 41 for 64,000×100 tracks=6,400,000 data files can be stored.

This is the case for one head; in the case of four heads as in FIG. 1, the number can be extended to 6,400,000×4=25.6 million. However, in the case of numerous heads, multiplex writing or similar is performed, and so there is a decrease to some extent from the above value. If thermal relaxation maps 41 are stored in the system area 19B on the outer periphery of the media 19 which is not used as a data area, there is no need to reduce the data area.

By storing the above thermal relaxation maps 41 in the system area 19B within the HDD, this information can be read periodically, and when the update date (number of days elapsed) exceeds a certain threshold value (for example, whether a fixed period has elapsed from the manufacturing date, and a comparison with the current-time information provided by the host) access to the position of the LBA information indicated by the map 41 is initiated, and measurement of maximum-likelihood information (VTM) or the read-only error rate is started.

When as a result the required VTM or error rate is not satisfied, all the target LBAs are read from the disk 19, the data is held in the buffer 14, and an operation to re-write (re-record) the relevant data on the disk 19 is performed automatically by the HDD (MCU 11).

Figure 6:
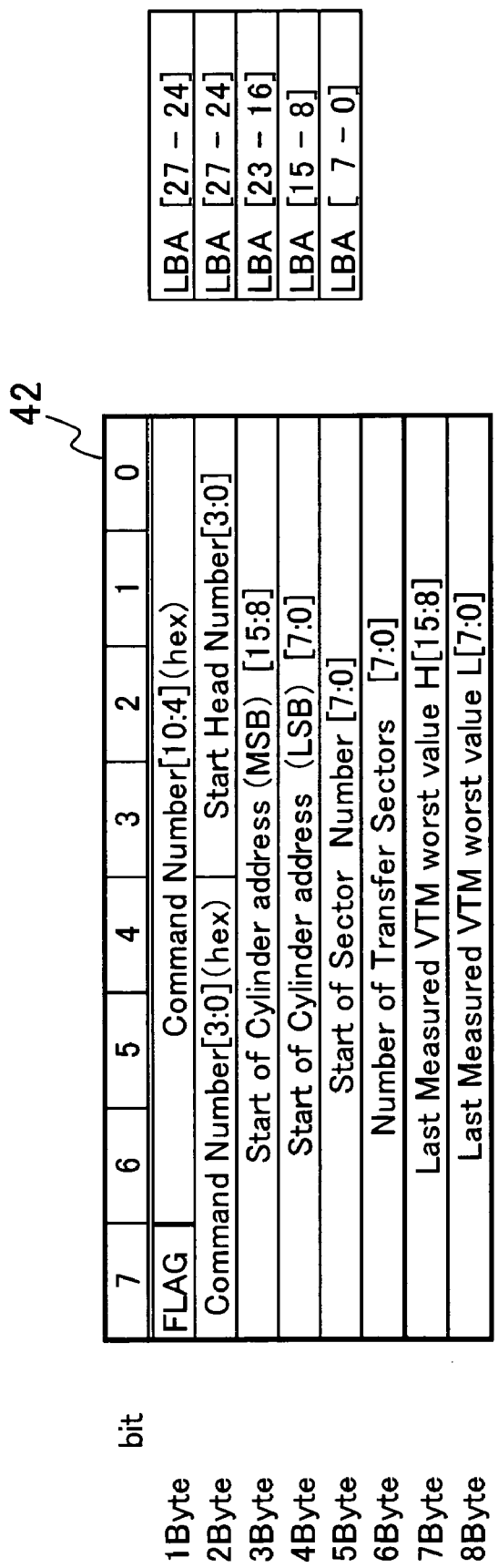
FIG. 6 explains the thermal relaxation map RAM area of FIG. 1.

FIG. 6 explains the thermal relaxation map 42 for one command created in RAM 14 when receiving a write type command. In the case of a write type command, the values of the command request CHS (or, for the LBA format, the LBA) as well as the number of sectors requested for transfer (the number of write sectors) are stored in the RAM 14. This operation is executed until processing is completed for the entire command. After processing for the entire command is completed, the thermal relaxation maps 42 such as that shown in FIG. 6 are created in RAM 14.

That is, the first byte stores a flag and the upper part of the command number; the second byte holds the lower part of the command number and the starting head number; the third and fourth bytes hold the starting cylinder address; the fifth byte holds the starting sector number; the sixth byte holds the number of transfer sectors; and the seventh and eighth bytes hold the measured maximum-likelihood information (VTM), as described below.

The thermal relaxation map for one command has the eight-byte configuration described above; data is added in similar format for the second and subsequent commands, and the locations of data writing for all write type commands are stored in the thermal relaxation maps 42 in RAM 14 until commands are completed.

For example, if command numbers from 0 to 7 FF are prepared, then data can be stored in RAM 14 until 2048 commands are issued, and a thermal relaxation RAM area must be reserved in RAM 14 for this purpose. For example, in the above, a space of 8 bytes×2048=16 kiro-bytes is required.

After the entire command is completed, if there is no next request from the host 30, the thermal relaxation map creation processing (explained in FIG. 13 and beyond) is started. In this processing, VTM measurements are executed for the number of transfer request sectors from all the relevant CHS in the thermal relaxation maps 42 (VTM measurements are described below). The measured VTM values are stored in the seventh and eighth bytes of the thermal relaxation maps 42. If there is a request from the host during measurements, the measurements are interrupted, and the flags in the thermal relaxation maps 42 indicate this interruption.

Figure 7:
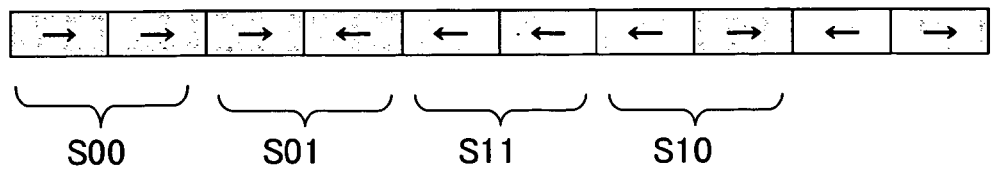
FIG. 7 explains a magnetization pattern used to explain maximum-likelihood information in an embodiment of the invention.
Figure 8:
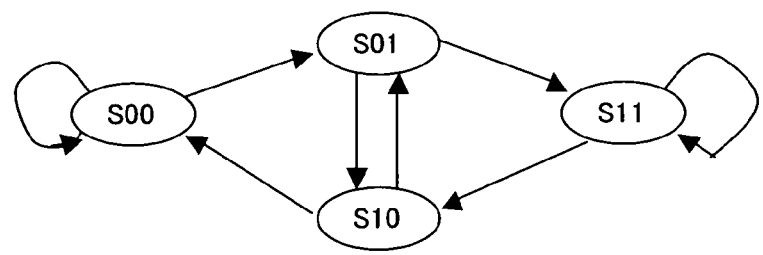
FIG. 8 is a state transition diagram of the magnetization pattern of FIG. 7.
Figure 9:
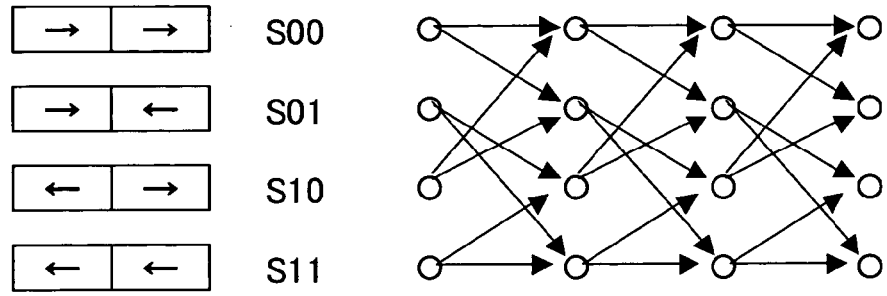
FIG. 9 is a trellis diagram for the state transitions of FIG. 8.

Next, the maximum-likelihood information for measurement and evaluation is explained using FIG. 7 through FIG. 10. FIG. 7 explains the magnetization inversion patterns in magnetic recording; there are four possible patterns, which are "S00", "S01", "S10", and "S11". FIG. 8 shows the state transition diagram for these patterns, and FIG. 9 uses a trellis diagram to explain the state transitions. As shown in FIG. 8 and FIG. 9, the "S00" and "S11" patterns may be continued, but the "S01" and "S10" patterns are never continued.

In the Viterbi detection method (maximum-likelihood detection method), this state transition diagram and trellis diagram are used to search for the most probable data series from the data context; as the method used to search for the most probable data series, the sums of the squares of errors (metric values) are used. Metric values are obtained from the differences between sampled values and ideal values (for example, for Partial Response class 4, "1", "0", "−1").

Maximum-likelihood information used in determining the maximum-likelihood data for this Viterbi algorithm is explained for the case of VTM (Viterbi Trellis Margin). The VTM value is correlated with the error rate. The Viterbi detector 16C is a kind of maximum-likelihood detector; in the above read channel, the sum of squared errors of the Viterbi metric pass is called the "Viterbi trellis margin", and a monitor circuit for monitoring the VTM is provided in the Viterbi detector 16C.

Figure 10:
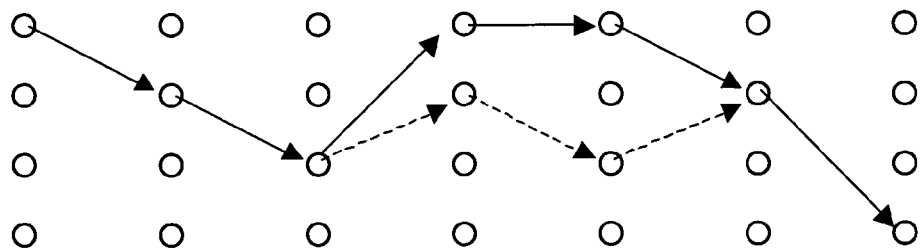
FIG. 10 explains operation of the maximum-likelihood decoder of FIG. 7 through FIG. 9.

As shown in FIG. 10, when two seemingly-probable data series (one indicated with a bold line, the other with a broken line) are discovered from the above-described trellis diagram, the number of times the difference in the metric values (sum of the squared errors) exceeds a certain threshold value is counted for each of the data series. The VTM is this count value; the data series with the lower VTM value is taken to be the most probable data series.

An advantage to using the number of times the difference in metric values (sums of squares of errors) for a data series exceeds a certain threshold value (here, the VTM) in data degradation judgments is that, whereas in error rate measurements read error judgments are performed upon each read operation and read operations must be continued until a fixed number of operations is reached, in the case of VTM a numerical value equivalent to the error rate is obtained, as the VTM value, upon executing just a single read operation for the relevant location.

Consequently there are the advantages that less time is required and signal quality can be obtained accurately. In this invention, ordinary error rates can also be used. However, it is preferable that VTM values be utilized to obtain these advantages.

Figure 11:
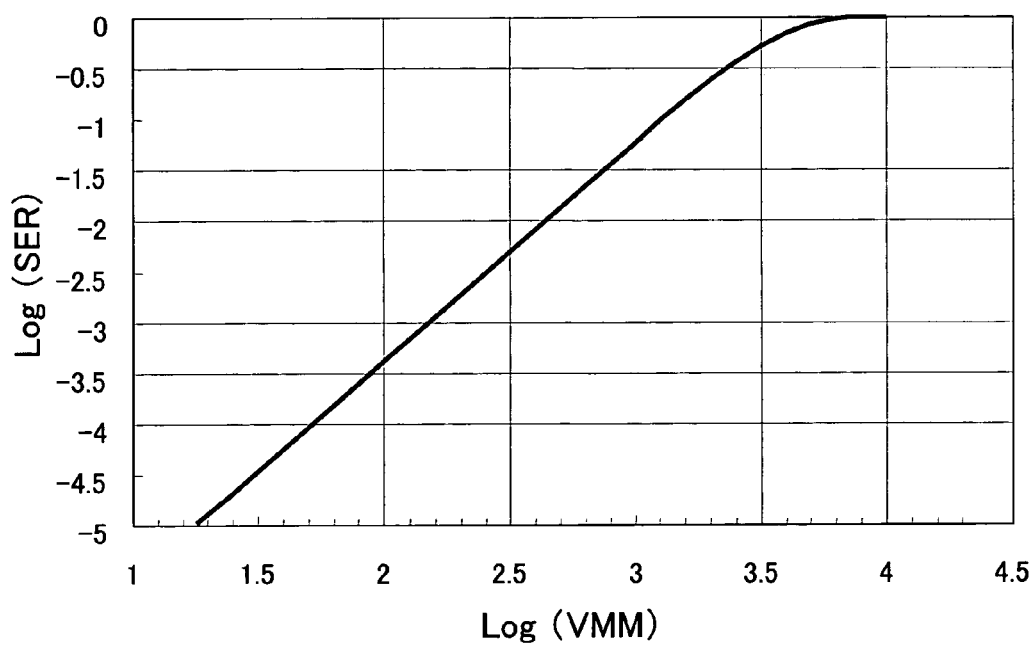
FIG. 11 shows the relation between maximum-likelihood information and error rates in this invention.

FIG. 11 shows the relation between VTM values and error rates (SER: Signal/Error Ratio). The horizontal axis shows VTM values on a log scale, and the vertical axis shows error rates, also on a log scale. For example, when a certain number of sectors are read, and the metric value differences exceed the threshold value 100 times, 1000 times, and 10,000 times, the corresponding log-scale values are log(100)=2.0, log(1000)=3.0, log(10000)=4.0.

As shown in FIG. 11, there is a one-to-one correlation between VTM and SER, and so from the standpoint of saving time it is highly advantageous that VTM values, which can be measured by simple means, be used in place of error rates.

Figure 12:
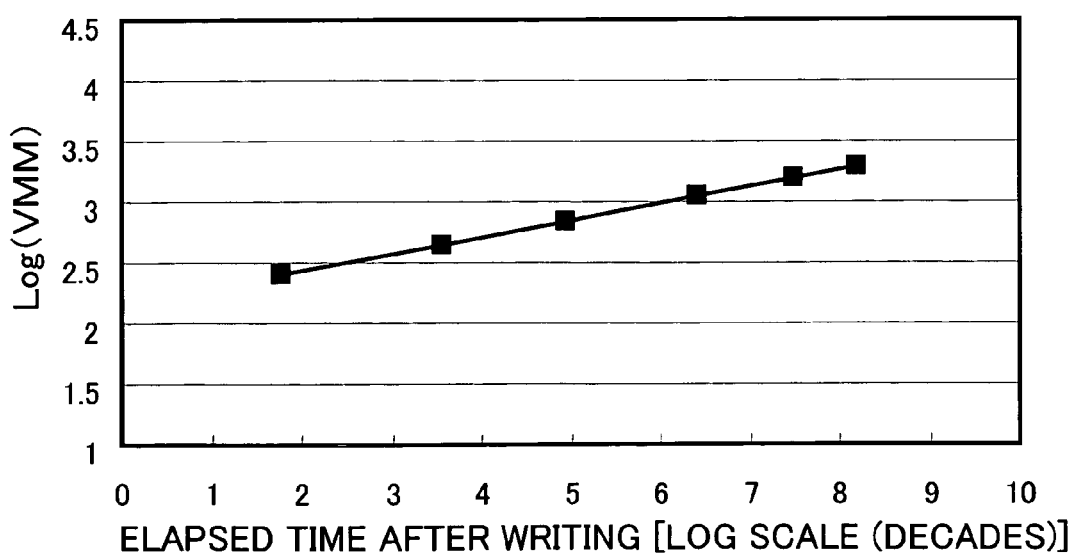
FIG. 12 shows the relation of elapsed time after writing to maximum-likelihood information degradation due to thermal relaxation in this invention.

FIG. 12 explains the results of measurement of VTM degradation due to thermal relaxation. In FIG. 12, similarly to FIG. 11, the horizontal axis shows on a log scale the elapsed time after writing, and the vertical axis shows VTM values on a log scale.

As shown in FIG. 12, whereas one minute after writing (1.78 decade) VTM=2.4, at five years (8.2 decades) later, VTM has degraded to 3.3. That is, from FIG. 11, the error rate is degraded by 1.5 decade. This slope can be expressed as (3.3−2.4)/(8.2−1.78)=0.14/decade.

In this invention, such a maximum-likelihood information characteristic is used to monitor the error rate degradation due to thermal relaxation employing the VTM, with maps created to monitor the recording degradation. When a certain reference value is exceeded, re-recording processing or re-re-placement assignment is performed, and by detecting signal recording degradation, loss of recorded data is prevented.

Thermal Relaxation Map Creation Processing

Figure 13:
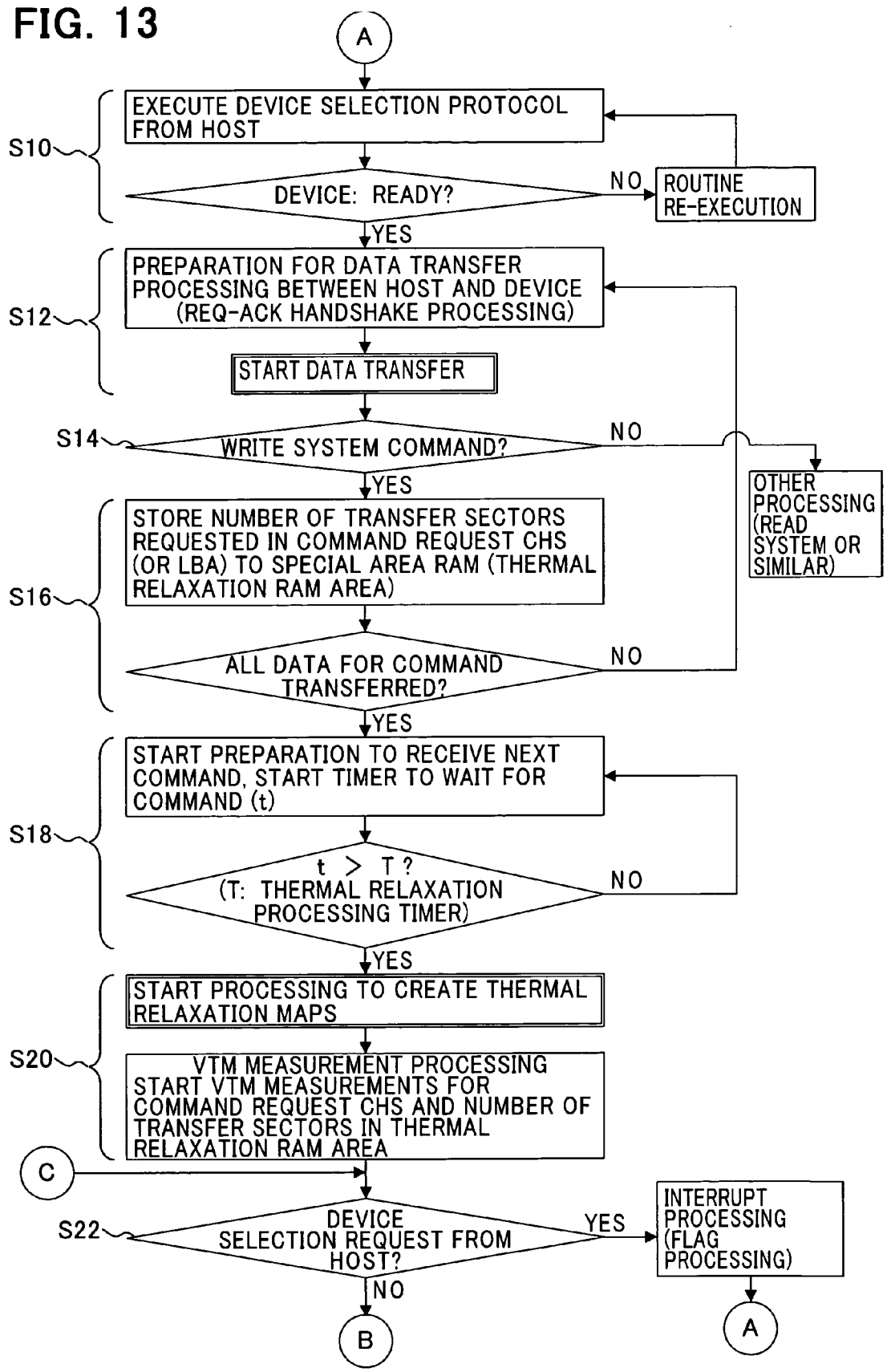
FIG. 13 shows the flow of thermal relaxation map creation processing (1) in an embodiment of the invention.
Figure 14:
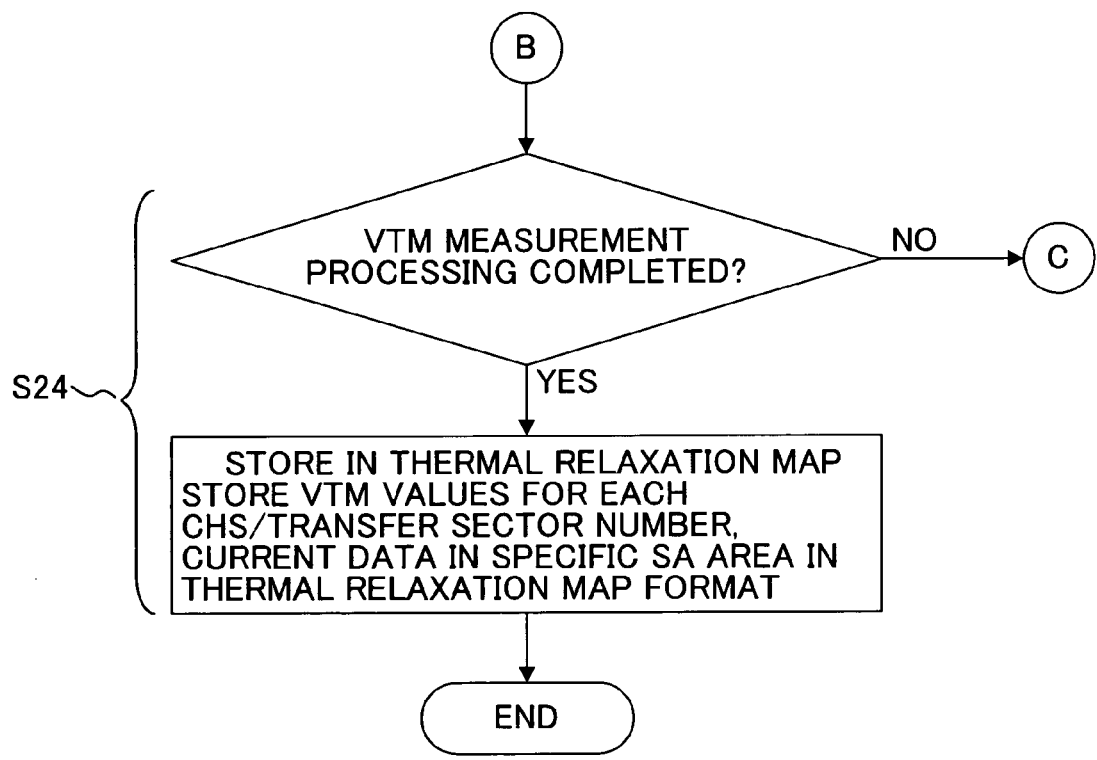
FIG. 14 shows the flow of thermal relaxation map creation processing (2) in an embodiment of the invention.

First, the above-mentioned thermal relaxation map creation is explained. FIG. 13 and FIG. 14 show the flow of processing to create thermal relaxation maps in an embodiment of the invention. The thermal relaxation map creation processing of FIG. 13 and FIG. 14 is explained referring to FIG. 1, FIG. 2, FIG. 3, and FIG. 6.

(S10) First, a device selection protocol is executed by the host 30, and a judgment is made as to whether the device (disk drive 10) is in the "Ready" state.

(S12) If the device is in the Ready state, the host 30 and device 10 execute handshake processing as preparation for data transfer. In general, by exchanging Request (REQ) signals and Acknowledge (ACK) signals, responses are obtained, and data transfer is then begun.

(S14) The MCU 11 of the drive 10 judges whether received data is a write type command. If judged not to be a write type command, the command (for example, a read type command, diagnostic command, or similar) processing is executed.

(S16) The MCU 11, upon judging the command to be a write type command, stores in a special area of the RAM the values of the requested command CHS (or in the case of LBA format, the LBA) and the number of transfer clusters requested. This operation is executed until processing is completed for the entire command. After processing is completed for the entire command, the data is stored in the thermal relaxation RAM area 42 (see FIG. 6) indicated below. That is, as shown in FIG. 6, a thermal relaxation map is created for each single command. In such a thermal relaxation map in the RAM 14, the first byte holds a flag and the upper part of the command number; the second byte holds the lower part of the command number and the starting head number; the third and fourth bytes hold the starting cylinder address; the fifth byte holds the starting sector number; the sixth byte holds the number of transfer sectors; and the seventh and eighth bytes hold the measured maximum-likelihood information (VTM), as described below.

(S18) After data transfer ends for the entire command, the MCU 11 uses well-known write system processing, not shown, to issue an instruction to the HDC 12 to write the write data in the RAM 14 to the disk 19. Together with this, the MCU 11 starts an internal timer used to judge whether there is a next request from the host 30. A judgment is then made as to whether the timer count time t has exceeded the thermal relaxation timer value T set in advance.

(S20) If the timer value t exceeds the thermal relaxation timer value T, the MCU 11 starts thermal relaxation map creation processing. In this processing, VTM measurement is executed for all of the number of transfer sectors requested from the relevant CHS in the thermal relaxation maps 42 in the RAM 14. As indicated in FIG. 2 and FIG. 10, in VTM measurements the data for the number of transfer sectors requested from the relevant CHS is read from the disk 19, and the VTM of the Viterbi decoder 16 is observed. The measured VTM value is stored in the seventh and eighth bytes of the thermal relaxation map 42.

(S22) During the execution of VTM measurements, the MCU 11 judges whether there has been a device selection request from the host 30. Upon judging that there has been a device selection request, the MCU 11 interrupts processing and returns to execution of the host request in step S10. The interruption processing at this time is performed using the flag bit in the first byte of the thermal relaxation maps 42. For example, when VTM measurement is completed for a certain command, "1" is written to the flag bit for the thermal relaxation map 42 for this command, whereas "0" is written when processing is not completed. Hence after completion of the request by the host 30, judgments can be made easily even after resuming thermal relaxation map creation processing of step S20, and processing can be performed for the maps not yet processed.

(S24) Next, the MCU 11 judges whether all VTM measurement processing has been executed. If not all processing has been executed, the MCU 11 returns to step S22. If on the other hand it is judged that all VTM measurement processing has been executed, the values in the thermal relaxation RAM area 42 are stored in the system area 19B on the predetermined media 19 as the thermal relaxation maps 41 described above. The thermal relaxation maps 41 in FIG. 3 have the same eight-byte configuration as do the thermal relaxation RAM maps 42 of FIG. 6; but when storing the data on the media 19, there is no need for the command number, flag, or similar, and so the current date, obtained in advance from the host 30, is recorded as the write date. Because VTM measurements have been performed on this day, the number of days elapsed in the second byte of the thermal relaxation map 32 in FIG. 3 is initially stored as "0".

Rather than obtaining the current date from the host 30, the write date may be obtained from a hardware timer (in which the HDD itself has a battery or similar, and the date is calculated using the MCU clock count) by the disk drive 10 itself.

Thus thermal relaxation maps 41 are created for all the write data specified by commands in write system command units, so that there is no need to create thermal relaxation management information in data units. Hence creation of thermal relaxation management information is simple, and little storage area is required. As explained below, re-recording judgment is also easy using such thermal relaxation maps, and measurement and updating of maximum-likelihood information is also easy.

Thermal Relaxation Map Update Processing

Figure 15:
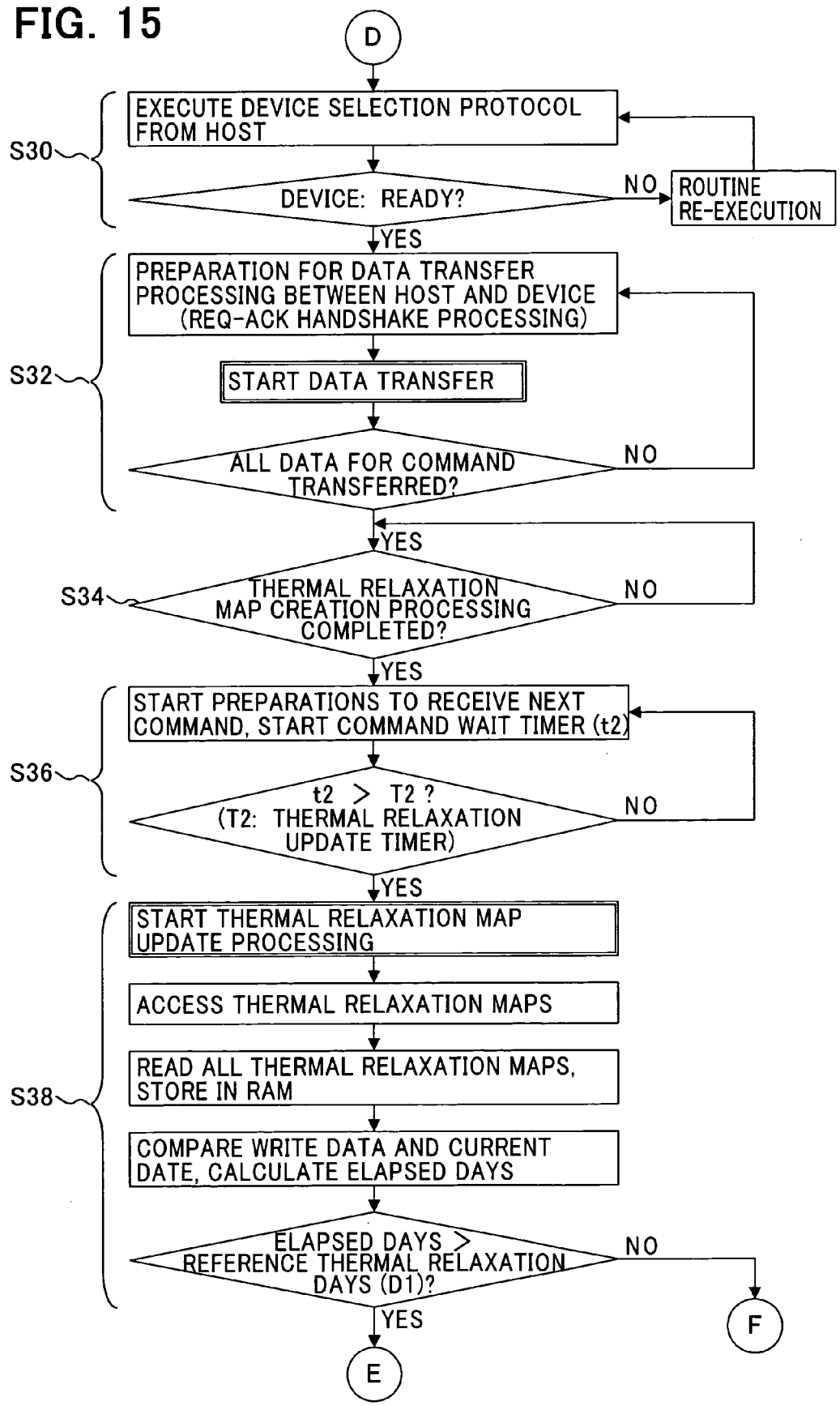
FIG. 15 shows the flow of thermal relaxation map update processing (1) in an embodiment of the invention.
Figure 16:
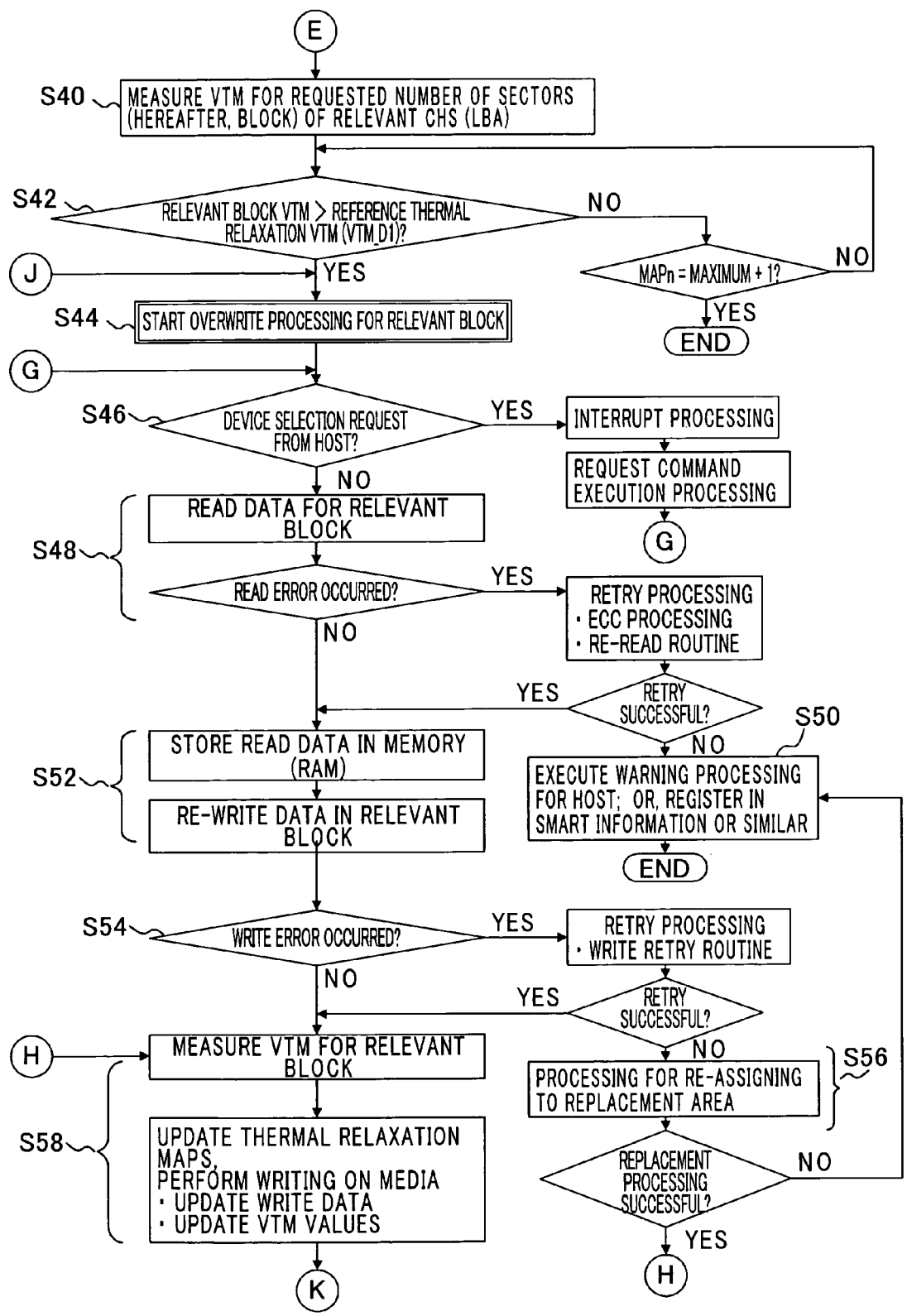
FIG. 16 shows the flow of thermal relaxation map update processing (2) in an embodiment of the invention.
Figure 17:
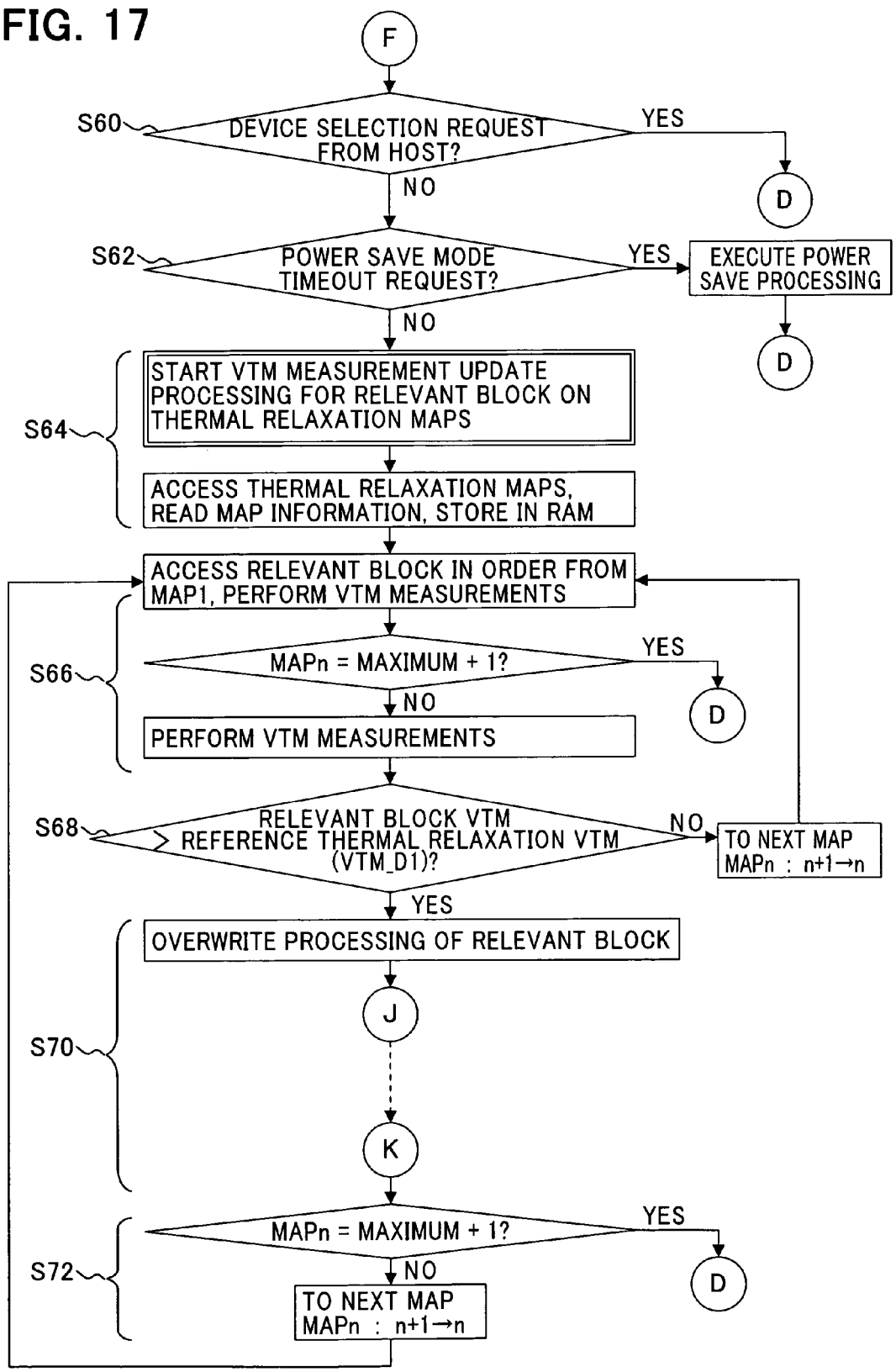
FIG. 17 shows the flow of thermal relaxation map update processing (3) in an embodiment of the invention.

Next, updating of the above-described thermal relaxation maps is explained. FIG. 15, FIG. 16 and FIG. 17 show the flow of processing to update thermal relaxation maps in an embodiment of the invention. The thermal relaxation map update processing of FIG. 15, FIG. 16 and FIG. 17 is explained referring to FIG. 1, FIG. 2, FIG. 3, and FIG. 6.

(S30) First, a device selection protocol is executed by the host 30, and a judgment is made as to whether the device (disk drive 10) is in the "Ready" state.

(S32) If the device is in the Ready state, the host 30 and device 10 execute handshake processing as preparation for data transfer. In general, by exchanging Request (REQ) signals and Acknowledge (ACK) signals, responses are obtained, and data transfer is then begun. The MCU 11 of the drive 10 executes data receive operations until data transfer ends for all the data of the command.

(S34) After processing for the entire command has ended, the MCU 11 judges whether the thermal relaxation map creation processing of FIG. 13 and FIG. 14 has ended.

(S36) If the thermal relaxation map creation processing has ended for the entire command, the MCU 11 starts a command wait timer TT2 to prepare for the reception of the next command. A judgment is then made as to whether the timer count time t2 exceeds a preset thermal relaxation update time T2.

(S38) Upon judging that the timer value t2 exceeds the thermal relaxation update time T2, the MCU 11 starts the thermal relaxation map update processing. In this processing, first the MCU 11 accesses the thermal relaxation maps 41 in the system area 19B of a disk 19, reads all of the thermal relaxation maps 41, and writes the values into RAM 14. Next, the MCU 11 calculates, as the number of days elapsed, the difference between the write date (the first byte in FIG. 3) of the data in the thermal relaxation map 41 written into RAM 14 and the current date. The MCU 11 compares the number of elapsed days with a predetermined reference number of thermal relaxation days D1, and if the number of elapsed days does not exceed the reference number of days D1, processing proceeds to processing F in FIG. 17.

(S40) On the other hand, when the number of elapsed days exceeds the reference number of days D1, the MCU 11 proceeds to the processing E of FIG. 16, and executes VTM measurements for all of the requested transfer sectors from the relevant CHS in the thermal relaxation maps 41 in RAM 14. As indicated in FIG. 2 and FIG. 10, VTM measurements are performed by reading from the disk 19 the data for the requested number of transfer sectors from the relevant CHS, and observing the VTM values of the Viterbi decoder 16c. The measured VTM values are stored in the seventh and eighth bytes in the thermal relaxation maps 41.

(S42) The MCU 11 judges whether the VTM values for a block for which VTM measurements have been performed exceeds a reference thermal relaxation VTM value (VTM_D1). If the value is not exceeded, comparison of VTM measurement values for the block is continued until thermal relaxation maps 41 reach the maximum number for registration.

(S44) If the VTM values for a block for which VTM measurements have been performed exceeds the reference thermal relaxation VTM value (VTM_D1), overwrite processing for the block is begun.

(S46) During the start of overwrite processing, the MCU 11 judges whether there has been a device selection request from the host 30; if there has been a device selection request, processing is interrupted, and the command requested by the host 30 is executed. The presence of a selection request is then judged again.

(S48) If on the other hand there has been no device selection request from the host 30, the MCU 11 overwrite continues processing. That is, the MCU 11 performs read operations from the disk 19 for the block. At this time, the MCU 11 judges whether a read error has occurred. If an error has occurred, the MCU 11 performs retry processing, and returns after completion of recovery (successful retry). In retry processing, ECC processing or other retry routine processing is performed.

(S50) On the other hand, if an unrecovered error occurs even after retry processing, the MCU 11 executes warning processing for the host 30. Or, the unrecovered error is registered in SMART (Self Monitoring, Analysis and Report Technology) information, and processing of the relevant sectors ends.

(S52) If in step S48 the MCU 11 judges that no read errors have occurred, the read-out block data is stored in RAM 14, and processing for rewriting to the disk 19 is executed.

(S54) During this re-writing, the MCU 11 checks for the occurrence of write errors, and upon occurrence of an error, the MCU 11 performs retry (write retry) processing, and returns after retry success. For example, write errors may include seek errors, off-tracking errors, and the absence of change in frequency for a fixed period in the input to the pre-amp 18 of FIG. 1.

(S56) On the other hand, if retry is not successful even after retry processing, the MCU 11 performs reassignment to a replacement area of the disk 19, and performs replacement processing. If this replacement processing succeeds, processing proceeds to step S58; if the replacement processing does not succeed, processing returns to step S50.

(S58) If no write errors occur, the MCU 11 performs VTM measurements for the next relevant location. This measurement is similar to that of step S40. As update processing for thermal relaxation maps 41, the MCU 11 then updates the write date in the first byte of the thermal relaxation maps 41 using the current date, and updates the VTM value (seventh and eighth bytes) to the previously measured value. The MCU 11 then re-writes the updated thermal relaxation maps 41 in RAM 14 to the system area 19B on the media 19, and ends the update processing.

(S60) On the other hand, if in step S38 the elapsed time has reached the reference number of thermal relaxation days (D1), the processing of FIG. 17 is executed. For example, when the reference number of thermal relaxation days is one year, because a case in which the actual recorded data degradation is advancing is assumed, the actual data VTM is measured, a judgment is made as to whether the reference thermal relaxation VTM value has been reached, and if reached, data re-writing is executed. First the MCU 11 judges whether there has been a device selection request from the host 30. If there has been a device selection request, processing returns to step S30 in FIG. 15.

(S62) On the other hand, if it is judged that there has been no device selection request, the MCU 11 judges whether there has been a power-saving mode timeout request from within the device. If there has been a power-saving mode timeout request, power-saving processing (for example, sleep processing) is executed, and processing returns to step S30 of FIG. 15.

(S64) In step S62, the MCU 11, upon judging that there has been no power-saving mode timeout request, starts VTM measurement update processing for the relevant block in thermal relaxation maps. In this processing, similar to that of step S38, the MCU 11 accesses the thermal relaxation maps 41 on the system area 19B of the disk 19, reads all the thermal relaxation maps 41, and stores the values in RAM 14.

(S66) Next, the MCU 11 executes VTM measurements for all the requested number of transfer sectors from the relevant CHS within the thermal relaxation map 41 with map number 1 of each of the thermal relaxation maps 41 stored in RAM 14. That is, a judgment is made as to whether the measurement map number n has reached (maximum map number+1). If the measurement map number n has reached (maximum map number+1), then updating of all maps is complete, and processing returns to step S30 in FIG. 15. If however the measurement map number n has not reached (maximum map number+1), the VTM for the number of sectors of the map is measured. As indicated in FIG. 2 and FIG. 10, data for the requested number of transfer sectors from the relevant CHS is read from the disk 19, and the VTM of the Viterbi decoder 16c is observed. The measured VTM value is stored in the seventh and eighth bytes in the thermal relaxation map 41.

(S68) The MCU 11 judges whether the VTM for the block for which VTM measurement was performed exceeds the reference thermal relaxation VTM (VTM_D1). If the value is not exceeded, the map number MAP-n is updated to n+1 to address the next map 41, processing returns to step S66, and VTM measurements of blocks and comparisons are continued until thermal relaxation maps 41 reach the maximum number for registration.

(S70) If the VTM of a block for which VTM measurement was performed exceeds the reference thermal relaxation VTM (VTM_D1), the MCU 11 starts overwrite processing for the block. That is, the processing from step S44 to step S58 of FIG. 15 is executed, and when the reference thermal relaxation value is reached, re-write processing is performed.

(S72) Next, the MCU 11 judges whether the measurement map number MAP-n has reached (maximum map number +1). If the measurement map number MAP-n has reached (maximum map number +1), updating of all maps ends, and processing returns to step S30 of FIG. 15. If however the measurement map number MAP-n has not reached (maximum map number +1), then the map number MAP-n is updated to n+1 to address the next map 41, processing returns to step S66, and VTM measurement and comparison of blocks is continued until thermal relaxation maps 41 reach the maximum number for registration.

Thus when the reference number of thermal relaxation days is not reached, VTM measurements, updating, and re-writing are performed in order, until the maximum map number is reached. Upon performing this processing, there exists no data for which the reference thermal relaxation VTM (D1) is exceeded, the signal quality of the data can be kept within reference values, and dangerous states possibly resulting in data loss can be avoided.

Of course, as indicated in FIG. 16, when the reference number of thermal relaxation days is reached, VTM measurements, updating, and re-writing are performed for all maps. Hence there exists no data for which the reference thermal relaxation VTM (D1) is exceeded, the signal quality of the data can be kept within reference values, and dangerous states possibly resulting in data loss can be avoided.

That is, maximum-likelihood information is first used to judge data degradation due to thermal relaxation, and merely by performing a single read operation for the relevant location, a numerical value equivalent to the error rate can be obtained. As a result there are the advantages that less time is required to obtain the signal quality with accuracy.

Because data is managed using thermal relaxation maps in write command units, management information can be easily created, updated, and used in overwrite decisions, and the accuracy of overwrite judgments is improved. Moreover, only a small storage area is required for the management information, so that the media can be utilized effectively.

Other Embodiments

Figure 18:
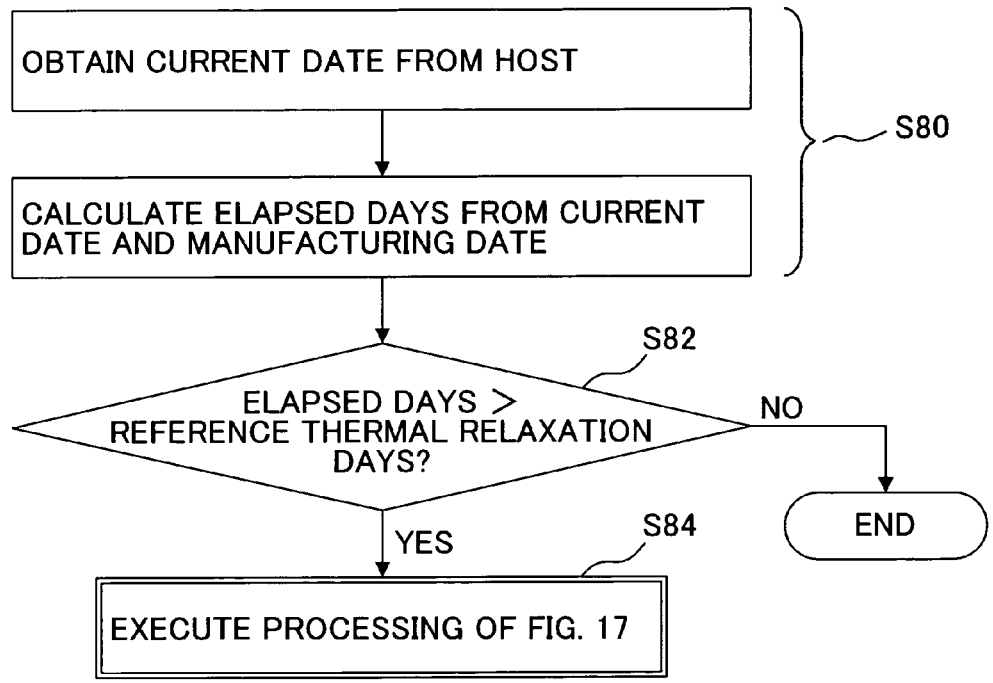
FIG. 18 shows the flow of thermal relaxation map update processing in another embodiment of the invention.

FIG. 18 shows the flow of thermal relaxation map update processing in another embodiment of the invention; in this example, the hard disk drive 10 automatically performs processing in which the elapsed time is calculated from the manufacturing date for the disk drive 10 and time information from the host system, and if a fixed time has elapsed, data not meeting a certain standard is re-read and the data is written back.

(S80) The MCU 11 acquires the current date from the host 30. The single-byte data 40 for the manufacturing date shown in FIG. 3, in the system area 19B of a disk 19, is written at the time of product shipment. The MCU 11 calculates the elapsed time (elapsed number of days) from this manufacturing date on the disk drive 10 and from the current date obtained from the host system.

(S82) The MCU 11 compares the calculated number of elapsed days with a reference thermal relaxation number of days set to a certain fixed length of time, and if the number of elapsed days does not exceed the reference number of days, ends processing.

(S84) If on the other hand the number of elapsed days exceeds the reference number of days, the MCU 11 executes the processing of FIG. 17.

By thus judging the number of years and months that have elapsed from the manufacturing date, and, if a certain fixed time has elapsed, by using the thermal relaxation map described in the above first embodiment, then an operation equivalent to data scanning (that is, measurement of the error rate in sector units) can be performed through VTM measurements. Further, the HDD itself can automatically perform an operation in which, when a certain standard value is not satisfied, the read-out data of the relevant sector is written back.

Figure 19:
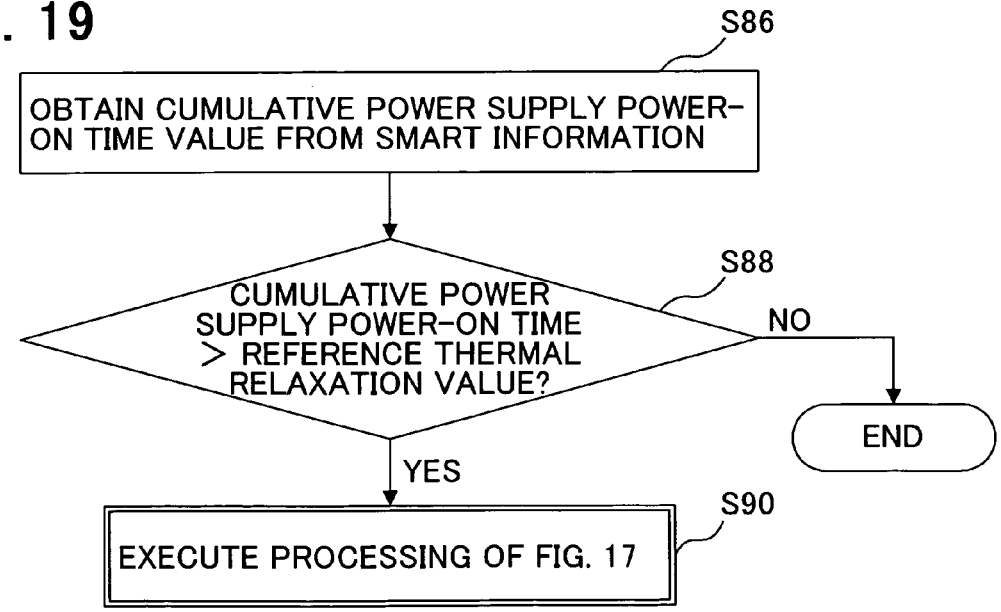
FIG. 19 shows the flow of thermal relaxation map update processing in still another embodiment of the invention.
Figure 20:
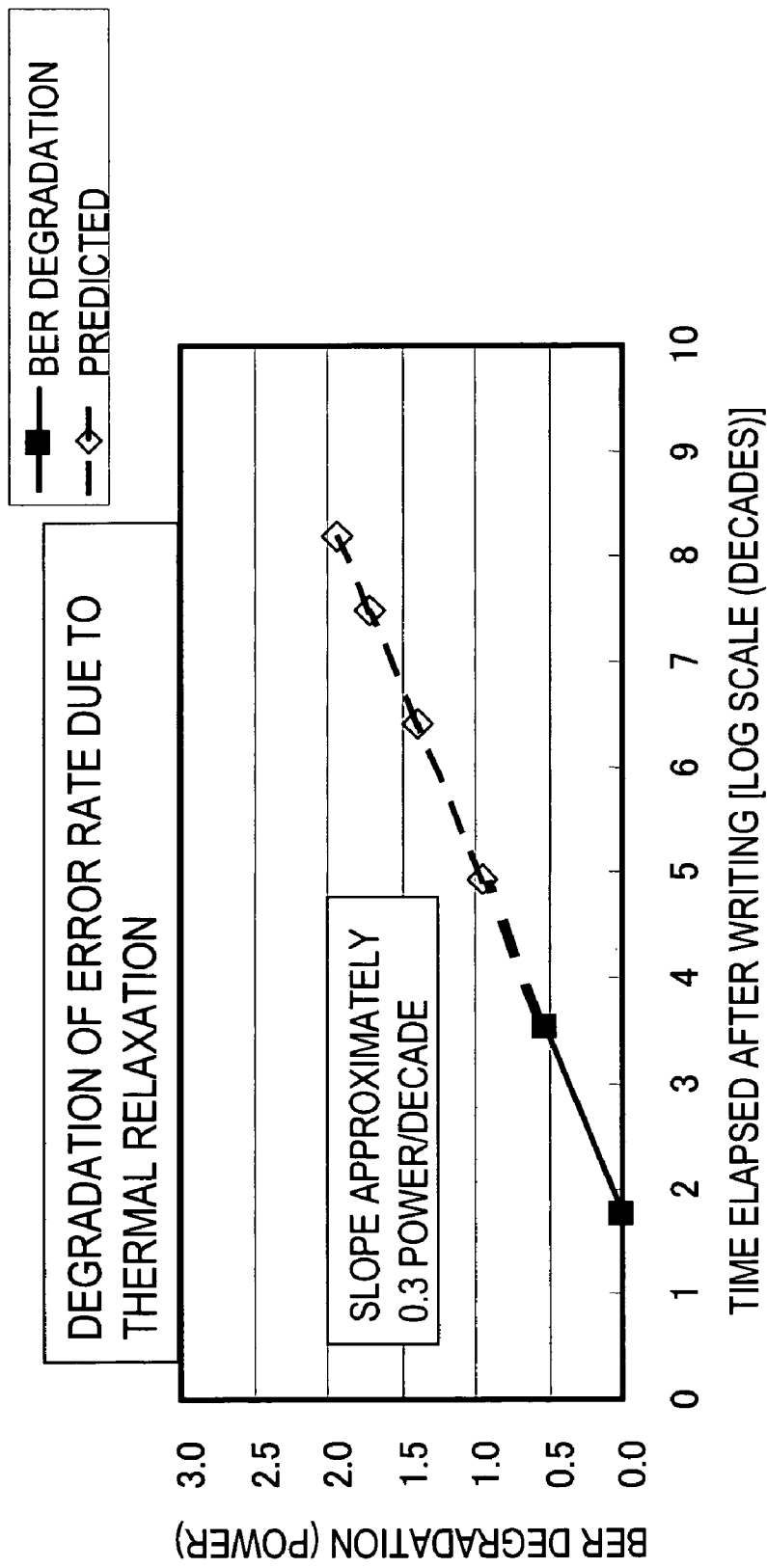
FIG. 20 shows the relation to degradation of the error rate due to the thermal relaxation addressed in this invention.

FIG. 19 shows the flow of thermal relaxation map update processing in still another embodiment of the invention; in this example, the hard disk drive 10 itself is made to automatically perform an operation in which the operating time which is a portion of SMART information, that is, the cumulative power-on time, is used to calculate the elapsed time, and if the elapsed time exceeds a certain fixed time, data not satisfying a certain standard is read out, and the data is then written back.

(S86) The MCU 11 acquires the cumulative power supply power-on time value which is a portion of the SMART (Self-Monitoring, Analysis and Reporting Technology) information.

(S88) The MCU 11 judges the elapsed time from the cumulative power supply power-on time value among the SMART information, and compares the result with a reference thermal relaxation value set as a certain fixed length of time. If the number of elapsed days does not exceed the reference number of days, processing ends.

(S90) If on the other hand the number of elapsed days exceeds the reference number of days, the MCU 11 executes the processing of FIG. 17.

In the above example, the cumulative power supply power-on time value is used; but other information may be acquired from the SMART information and used as a criterion for judgment. For example, the cumulative number of spindle motor rotations, the cumulative number of read errors, the throughput performance threshold, the cumulative number of seek errors, or the replacement processing occurrence threshold, may be used.

In the above-described embodiments, a magnetic disk device is used as the disk storage device in explanations; but application to a storage device using optical discs, magneto-optical discs, or other storage media is also possible. Also the interface is not limited to an ATA interface, and application to other interfaces is possible. Further, the case of a disk device having four disk surfaces was explained; but application to a disk device with two surfaces, or to a device having numerous disk surfaces, is also possible.

Quality information was explained in terms of maximum-likelihood information, and in particular VTM values; but maximum-likelihood information in other formats, read error rates, or other types of quality information indicating the state during reading can be used. Further, write type commands are not limited to those of these embodiments; a portion of these may be used, and application to other formats is also possible.

This invention has been explained in terms of a number of embodiments, but this invention can be variously modified within the scope of the invention, and these variations are not excluded from the scope of the invention.

Since data degradation due to thermal relaxation is judged by using information which is related to an read error detected by the channel circuit, a record data degradation can be accurately detected, so thermal relaxation is data loss can be prevented, contributing to data loss prevention in recording media with ever-higher recording densities.

What is claimed is:

1. A media storage device, comprising:
    a head which reads and writes data from and to a storage medium which magnetically stores data;
    a channel circuit which demodulates read data from said head and having a maximum-likelihood decoder which calculates a number of times that cumulative sum of errors between ideal values and the read data exceeds a prescribed value from the context of stated transitions which are possible for the read data and detects data series of which the number of times is small, as a most probable data series;
    a control circuit which controls read and write operations of said head according to commands from a higher-level device; and
    a table which holds storage area information of each record, in record units of said storage medium wherein said control circuit stores said storage area information of said record in said table when receiving a write command, reads, via the channel circuit, data recorded on the storage medium in record units by referring to said table during idle time of which a command has not arrived at a predetermined time from said higher-level device, measures said number of times detected by the maximum-likelihood decoder during reading, compares the measured number of times with a prescribed threshold value, and depending on the result of the comparison, re-records said data in record units in the storage medium.

2. The media storage device according to claim 1, wherein said table stores information indicating the time elapsed from the recording time,
    and said control circuit reads the information indicating the time elapsed from the recording time of the recorded data from the table, and performs the measurement for the record on which the time by the time elapsed information exceeds a reference time and compares the measured value with a prescribed threshold value after the measurement, and depending on the result of the comparison, re-records said data in record units in the storage medium.

3. The media storage device according to claim 2, wherein said table stores update date of measured value as well as the measured value in a record unit,
    and said control circuit reads the updated date as well as the measured value from the table, and performs the measurement and the update for the record on which an elapsed date from the updated date to a current date exceeds the reference date.

4. The media storage device according to claim 1, wherein said table stores manufacturing date information for the device,
    and said control circuit reads the manufacturing date information from the table, and upon judging that a number of days elapsed to current date exceeds a reference number of days, executes measurement and compares the measured value with a prescribed threshold value after the measurement, and depending on the result of the comparison, re-records said data in record units in the storage medium.

5. The media storage device according to claim 1, wherein the storage medium comprises a magnetic storage medium.

6. A data loss prevention method of a media storage device having a head which reads and writes data from and to a storage medium, a channel circuit which demodulates read data from said head and modulates write data to said head and has a maximum-likelihood decoder which calculates a number of times that cumulative sum of errors between ideal values and the read data exceeds a prescribed value from the context of state transitions which are possible for the read data and detects data series of which the number of times is small as a most probable data series, and a control circuit which controls read and write operations of said head according to commands from a higher-level device, the method comprising the steps of:

storing, in record units in a management table, storage area information of each record;

reading via the channel circuit, in record units of the storage medium, data recorded on the storage medium by referring to said table during idle time of which a command has not arrived at a predetermined time from said higher-level device;

measuring said number of times detected by the maximum-likelihood decoder during the reading;

comparing the measured number of times with a prescribed threshold value; and depending on the result of the comparison, re-recording said data in record units in the storage medium.

7. The data loss prevention method of a media storage device according to claim 6, further comprising: a step of reading time information indicating elapsed time from a table; and a step of performing the measuring step for the record for which the time elapsed information exceeds a reference time.

8. The data loss prevention method of a media storage device according to claim 6, further comprising: a step of reading said manufacturing date information from said table; a step of judging that a number of days elapsed to current day exceeds a reference number of days; and a step of executing said measuring step when said judging step judges that said number of elapsed days exceeds said reference number of days.

* * * * *